United States Patent
Shin et al.

(10) Patent No.: US 8,204,383 B2
(45) Date of Patent: Jun. 19, 2012

(54) WIRELESS COMMUNICATION INTERFACE FOR PORTABLE WIRELESS TERMINAL

(75) Inventors: Dong-Jae Shin, Seoul (KR);
Dae-Kwang Jung, Suwon-si (KR);
Hong-Seok Shin, Suwon-si (KR);
Hyung-Woo Lee, Yougin-si (KR);
Sung-Bum Park, Suwonsi (KR);
Yoo-Jeong Hyun, Seongnam-si (KR);
Seong Hoon Hyun, legal representative, Sung Nam (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 973 days.

(21) Appl. No.: 11/978,839

(22) Filed: Oct. 30, 2007

(65) Prior Publication Data

US 2008/0102893 A1 May 1, 2008

(51) Int. Cl.
*H04B 1/38* (2006.01)
*H04B 10/10* (2006.01)

(52) U.S. Cl. ........ 398/129; 398/118; 398/128; 398/130; 398/131

(58) Field of Classification Search ........... 398/118–131
See application file for complete search history.

(56) References Cited

U.S. PATENT DOCUMENTS

| | | | | |
|---|---|---|---|---|
| 4,169,237 A | * | 9/1979 | English et al. | 313/1 |
| 5,218,356 A | * | 6/1993 | Knapp | 342/350 |
| 5,268,613 A | * | 12/1993 | Cunningham | 313/113 |
| 5,850,189 A | * | 12/1998 | Sakanaka et al. | 340/12.22 |
| 6,623,187 B1 | * | 9/2003 | Mihota | 398/118 |
| 7,302,181 B2 | * | 11/2007 | Ng et al. | 398/88 |
| 7,389,051 B2 | * | 6/2008 | Morioka et al. | 398/127 |
| 7,778,548 B2 | * | 8/2010 | Yamamoto | 398/78 |
| 2004/0022537 A1 | * | 2/2004 | Mecherle et al. | 398/41 |
| 2006/0056855 A1 | * | 3/2006 | Nakagawa et al. | 398/183 |
| 2006/0062099 A1 | * | 3/2006 | Yazaki et al. | 369/44.11 |
| 2006/0078915 A1 | * | 4/2006 | Fuchs et al. | 435/6 |
| 2006/0228747 A1 | * | 10/2006 | Fuchs et al. | 435/6 |
| 2007/0147843 A1 | * | 6/2007 | Fujiwara | 398/118 |
| 2009/0208221 A1 | * | 8/2009 | Sasai | 398/130 |

FOREIGN PATENT DOCUMENTS

KR 2006-5102 1/2006

* cited by examiner

*Primary Examiner* — Nathan Curs
*Assistant Examiner* — Tanya Ngo
(74) *Attorney, Agent, or Firm* — Cha & Reiter, LLC

(57) ABSTRACT

A wireless communication interface for a portable wireless terminal and a system for wirelessly communicating by a portable wireless terminal with another device via a free space. The interface facilitates aligning the portable wireless device with another devices for improved communication. The interface including: a light source for generating a data-modulated visible light signal and outputting the visible light signal to the free space; an optical detector for generating an electrical signal by photoelectrically converting the visible light signal input from the free space, and for outputting the electrical signal. A demodulation unit demodulates the electrical signal input from the optical detector, and outputs a data signal.

9 Claims, 4 Drawing Sheets

300

400

WIRELESS COMMUNICATION INTERFACE FOR PORTABLE WIRELESS TERMINAL

CLAIM OF PRIORITY

This application claims priority from an application entitled "Wireless Communication Interface For Portable Wireless Terminal," filed with the Korean Intellectual Property Office on Oct. 31, 2006 and assigned Serial No. 2006-106045, the contents of which are incorporated herein by reference in its entirety.

BACKGROUND OF THE INVENTION

1. Field of the Invention

The present invention relates to a portable wireless terminal. More particularly, the present relates to a wireless communication interface for a portable wireless terminal, which wirelessly communicates with other devices via a free space.

2. Description of the Related Art

In the field of a portable wireless terminals used for communications, such as a cellular phone or a personal digital assistant (PDA), and in the field of hand-held electronics such as a digital camera or an mp3 player, research has already been performed on a peripheral interface which provides communication between devices by mounting an IR-based module. The IR-based module is typically an infrared data association (IrDA) module, and related products have been developed and commercially used. In contrast to radio frequency (RF) communication protocols such as Bluetooth or Zigbee, infrared communication has advantages including there are no cross talk problems between devices, as well as providing reliable security, and a low-power usage design.

FIG. 1 illustrates an infrared communication system according to the prior art. The infrared communication system 100 includes first and second portable wireless terminals 110, 120. Each of the portable wireless terminals 110, 120 includes a light emitting diode (LED) for transmitting an infrared signal, and a photodiode (PD) for receiving an infrared signal. Communication between the first and the second portable wireless terminals 110, 120 is possible only when the two terminals are aligned. In another words, unlike, for example, line of sight, a radio link in IR is secured only when the two terminals 110, 120 aligned within the divergence range of each other's transmissions.

Moreover, as infrared rays are invisible, each of the portable wireless terminals 110, 120 transmits an infrared signal having a divergence angle greater than 30°, so as to easily secure the radio link. Referring to FIG. 1, the first portable wireless terminal 110 transmits an infrared signal 130 having a divergence angle $\theta_1$ greater than 30° to the second portable wireless terminal 120. An intensity distribution 140 of the infrared signal 130 on a plane perpendicular to a traveling direction of the infrared signal 130 shows the Gaussian (bell) form which is intense at the center, and weak at both ends.

Thus, the more closely the terminals 110, 120 are aligned with each other, the greater the likelihood that terminal 120 receives the most intense IR signal. In fact, the permissible distance between the terminals 110, 120 is at a maximum in the case where the alignment is such that the intensity received of the IR signal received is near or at the center of the Gaussian distribution.

However, one of the drawbacks of the aforementioned infrared communication system 100 as described is that infrared rays are not visible to the human eye, and thus there is difficulty to intuitively check communication security, and to secure a radio link. Also, due to the large divergence angle of an infrared signal, the infrared communication system 100 has difficulties in communicating with high speed and driving with low power. Accordingly, there is a long felt need in the art to provide a system that overcomes at least some of the drawbacks of the conventional infrared communication system.

SUMMARY OF THE INVENTION

Accordingly, the present invention has been made in part to solve at least some of the above-mentioned problems occurring in prior art communication systems. The present invention provides a wireless communication interface for a portable wireless terminal, which is designed for intuitively checking communication security, easily securing a radio link, communicating with high speed, and driving with low power.

In accordance with an exemplary aspect of the present invention, there is provided a wireless communication interface for a portable wireless terminal, which wirelessly communicates with another device via a free space, the interface including: a light source for generating a data-modulated visible light signal and outputting the visible light signal to the free space; an optical detector for generating an electrical signal by photoelectrically converting the visible light signal input from the free space, and outputting the electrical signal; and a demodulation unit for demodulating the electrical signal input from the optical detector, and outputting a data signal.

In accordance with another exemplary aspect of the present invention, there is provided a wireless communication interface for a portable wireless terminal, which wirelessly communicates with another device via a free space, the interface including: a first light source for generating a data-modulated infrared signal, and outputting the infrared signal to the free space; a second light source for generating a visible light signal having a divergence angle larger than the infrared signal, and outputting the visible light signal to the free space; an optical detector for generating an electrical signal by photoelectrically converting the infrared signal input from the free space, and outputting the electrical signal; and a demodulation unit for demodulating the electrical signal input from the optical detector, and outputting a data signal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, embodiments of the present invention will be described in detail with reference to the accompanying drawings. For the purposes of clarity and simplicity, a detailed description of known functions and configurations incorporated herein may be omitted to avoid obscuring the subject matter of the present invention with unnecessary descriptions of known functions and configurations. A person of ordinary skill in the art understand that the exemplary drawings and their associated descriptions are presented for illustrative purposes, and that the invention is not limited to the examples shown and described herein.

Figure 1:
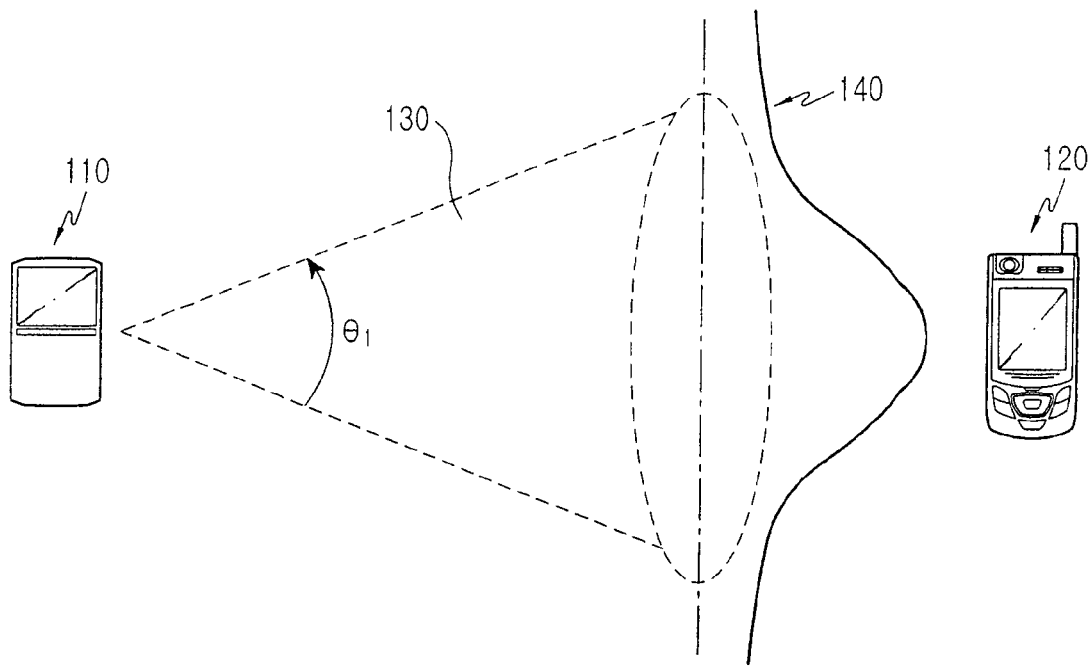
FIG. 1 illustrates an infrared communication system according to the prior art.
Figure 2:
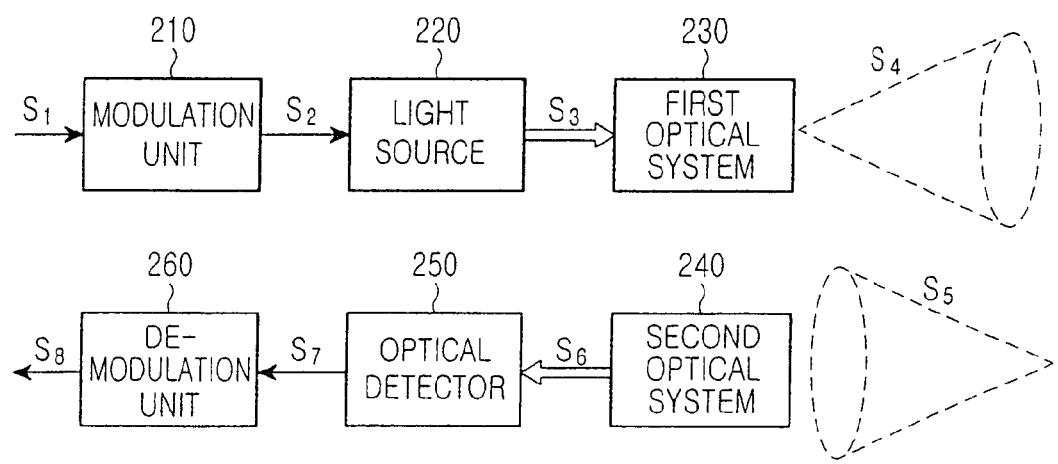
FIG. 2 is a block diagram illustrating the configuration of a wireless communication interface for a portable wireless terminal according to a first exemplary embodiment of the present invention.

FIG. 2 is a block diagram illustrating the configuration of a wireless communication interface for a portable wireless terminal according to a first exemplary embodiment of the present invention. The wireless communication interface 200 supports the portable wireless terminal which wirelessly communicates with another device via a free space. The wireless communication interface 200 includes a modulation unit 210, a light source 220, a first optical system 230, a second optical system 240, an optical detector 250, and a demodulation unit 260.

The modulation unit 210 modulates a data signal $S_1$ input from another component (such as a controller) inside the portable wireless terminal to provide a modulated electrical signal $S_2$ suitable for visible light communication, and outputs the signal. The data signal $S_1$ has power or a waveform (such as a binary signal) suitable for data processing by the component. The modulation unit 210 modulates the data signal $S_1$ to provide the modulated electrical signal $S_2$ having power or a waveform suitable for the visible light communication, and outputs the modulated electrical signal $S_2$ to the light source 220. That is, the modulation unit 210 can, for example, apply a bias voltage to the data signal $S_1$.

The light source 220 generates a visible light signal $S_3$ through electrical-to-optical conversion of the modulated electrical signal $S_2$ input from the modulation unit 210, and outputs the visible light signal $S_3$ to be received by the first optical system 230. The visible light signal $S_3$ has a wavelength within a range of 350~700 nm. The light source 220 may comprise a visible-light outputting source, such as a laser diode (LD), a light emitting diode (LED) or an LD/LED array, but a person of ordinary skill in the art appreciates that other types of light sources other than those shown and described may be used. For example, the light emitting efficiency of a white LED among visible light LEDs has already come to be higher than the efficiency of an incandescent lamp, and there are some products superior to a fluorescent lamp which are being developed, all of which may be a suitable light source for use in the present invention.

The first optical system 230 receives as an input the visible light signal $S_3$ output from the light source 220, adjusts a divergence angle of the visible light signal $S_3$, and outputs the signal. Also, the first optical system 230 can adjust an intensity distribution of the received visible light signal $S_3$, as an output. The visible light signal $S_4$ output from the first optical system 230 typically has an intensity distribution in a Gaussian (bell) form which is intense at the center, and weak at both ends, or in a bimodal form which is weak at the center, and intense at both ends. The first optical system 230 may be comprised of one or more lenses (convex, concave, or aspheric). A lens system related to adjusting a divergence angle or an intensity distribution is conventionally known, so a detailed description thereof will be omitted here.

If the intensity distribution of the visible light signal $S_4$ shows the Gaussian form, it is preferable that the signal has a divergence angle within a range of 0.1~30°. For visible light communication, a movement route of a visible light signal can be viewed with the naked eye, and thus it is easy to check communication security and secure a radio link. Therefore, for the visible light communication, there is no need to enlarge a divergence angle of a visible light signal in order to secure the radio link. Also, for high-speed communication, receiving power of the portable wireless terminal of a receiver should be high. When the visible light signal $S_4$ has a smaller divergence angle, a divergence loss is reduced, and thus the receiving power of the portable wireless terminal of the receiver generally increases. Therefore, the high-speed communication is possible. Also, for low-speed communication, transmitting power of the portable wireless terminal of a transmitter does not need to be large, and thus the light source 220 and the optical detector 250 can be driven with low power.

If the intensity distribution of the visible light signal $S_4$ shows the bimodal form, it is preferable that the signal has a divergence angle within a range of 1~40°. For the visible light signal in the Gaussian intensity form, it is possible to lose the radio link, because the edge of the visible light signal, that is, the edge of the communication coverage, cannot be easily viewed with the naked eye, and in the Gaussian form the intensity of the edge of the visible light signal gets weaker as the divergence angle of the visible light signal gets larger. Also, when the divergence angle of the visible light signal in the Gaussian intensity form is small, it is possible to lose the radio link due to slight movements, such as the user's hands trembling, or switching the holding of the device from one hand to another.

However, in the case where the visible light signal $S_4$ is provided in the bimodal intensity form, it is far more an infrequent occurrence that the radio link is lost when the user's hands tremble, because the edge of the visible light signal can be viewed with the naked eye due to an increased intensity at the edges (as opposed to the center of the intensity distribution), and the divergence angle of the visible light signal $S_4$ is large.

Still referring to FIG. 2, the second optical system 240 receives a visible light signal $S_5$ from the free space as an input, condenses the visible light signal $S_5$, and outputs the signal as signal $S_6$. As a light receiving area of the optical detector 250 is much smaller than a divergence angle of the visible light signal $S_5$ sent to (and received by) the second optical system 240, in order to improve receiving power of the optical detector 250, the second optical system 240 condenses the visible light signal $S_5$ to the light receiving area of the optical detector 250. The second optical system 240 may be comprised of one or more lenses (convex, concave, or aspheric). A condensing lens system is conventionally known, so a detailed description thereof will be omitted here.

The optical detector 250 receives as an input the visible light signal $S_6$, generates an electrical signal $S_7$ through photoelectric conversion of the visible light signal $S_6$ received from the second optical system 240, and outputs the electrical signal $S_7$ to the demodulation unit 260. One possible example of an optical detector 250 for use in the present invention includes but is not limited to a photodiode (PD).

The demodulation unit 260 receives as an input the electrical signal $S_7$ output from the optical detector 250, demodulates the received electrical signal $S_7$, and outputs a data signal $S_8$. The data signal $S_8$ output from the demodulation unit 260 is sent to another component (such as a controller) inside the portable wireless terminal. The demodulation unit 260 demodulates the electrical signal $S_7$ having power or a waveform suitable for the visible light communication, so as to output the data signal $S_8$ having power or a waveform (such as a binary signal) suitable for data processing by the component. That is, the demodulation unit 260 can eliminate, for example, a bias voltage applied to the electrical signal $S_7$ as a form of modulation.

Figure 3:
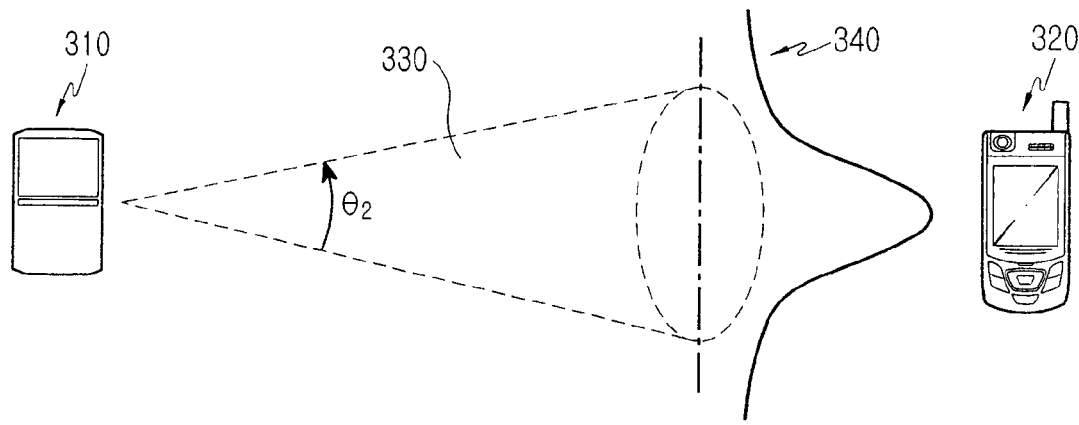
FIG. 3 illustrates a wireless communication system according to a exemplary first embodiment of the present invention.

FIG. 3 illustrates a wireless communication system according to a first exemplary embodiment of the present invention. The wireless communication system 300 includes a first and a second portable wireless terminal 310 and 320, and each of the portable wireless terminals 310, 320 and comprises the wireless communication interface 200 shown in FIG. 2. Communication between the first and second portable wireless terminals 310 is possible via a radio link. In addition, a movement route of a visible light signal can be viewed with the naked eye, and thus there is no need to enlarge a divergence angle of the visible light signal. Referring to FIG. 3, the first portable wireless terminal 310 transmits a visible light signal 330 having a divergence angle $\theta_2$ within a range of 0.1~30° to the second portable wireless terminal 320. An intensity distribution 340 of the visible light signal 330 on a plane perpendicular to a traveling direction of the visible light signal 330 in this particular example shows the Gaussian form, which is intense (high) at the center, and weak (lower) at both ends of the angular range.

Figure 4:
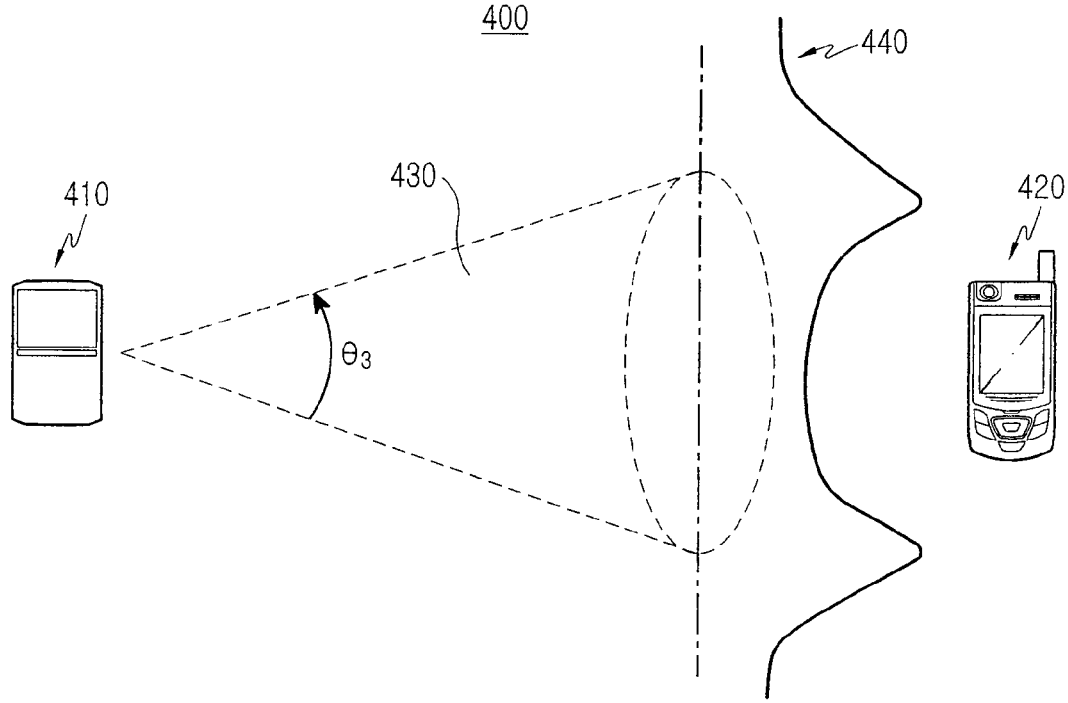
FIG. 4 illustrates a wireless communication system according to a second exemplary embodiment of the present invention.

FIG. 4 illustrates a wireless communication system according to a second exemplary embodiment of the present invention. The communication system 400 includes a first and second portable wireless terminals 410, 420, and each of the portable wireless terminals 410, 420 includes the wireless communication interface 200 shown in FIG. 2.

Still referring to FIG. 4, communication between the first and second portable wireless terminal 410, 420 is possible via a radio link, and an intensity distribution of a visible light signal received and transmitted between the first and second portable wireless terminals 410, 420 in this example shows the bimodal form, and thus the edge of the visible light signal can be easily viewed with the naked eye as the maximum intensity of the visible light signal is near the edges of the divergence angle $\theta_3$. Therefore, the visible light signal can have a large divergence angle. Thus, the first portable wireless terminal 410 transmits a visible light signal 430 having a divergence angle $\theta_3$ within a range of 1~40° to the second portable wireless terminal 420. The intensity distribution 440 of the visible light signal 430 on a plane perpendicular to a traveling direction of the visible light signal 430 shows the bimodal form which is weaker (lower in magnitude) at the center, and more intense (higher in magnitude) at both ends.

Figure 5:
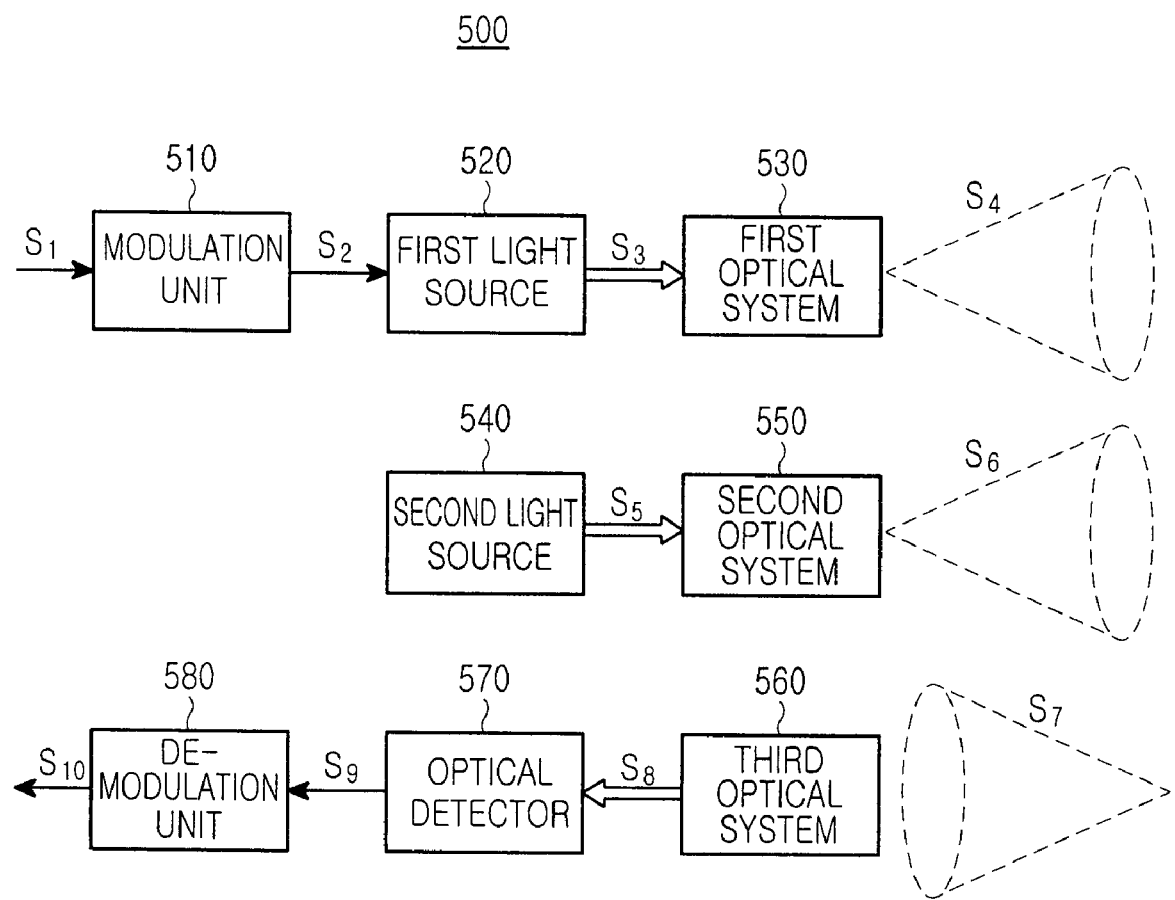
FIG. 5 is a block diagram illustrating the configuration of a wireless communication interface for a portable wireless terminal according to a second exemplary embodiment of the present invention.

FIG. 5 is a block diagram illustrating an example of one configuration of a wireless communication interface for a portable wireless terminal according to a second exemplary embodiment of the present invention. The wireless communication interface 500 supports the portable wireless terminal which wirelessly communicates with another device via a free space. The wireless communication interface 500 includes a modulation unit 510, a first light source 5620, a second light source 540, a first optical system 530, a second optical system 550, and a third optical system 560, an optical detector 570, and a demodulation unit 580.

The modulation unit 510 modulates a data signal $S_1$ input from another component (such as a controller) inside the portable wireless terminal to provide a modulated electrical signal $S_2$ suitable for infrared communication, and outputs the signal $S_2$. The data signal $S_1$ has power or a waveform (such as a binary signal) suitable for data processing by the component. The modulation unit 510 modulates the data signal $S_1$ to the electrical signal $S_2$ having power or a waveform suitable for the infrared communication, and outputs the modulated electrical signal $S_2$ to the first light source 520. That is, the modulation unit 510 can apply, for example, a bias voltage to the data signal $S_1$ as a form of modulation.

The first light source 520 generates an infrared signal $S_3$ through electrical-to-optical conversion of the modulated electrical signal $S_2$ input received from the modulation unit 510, and outputs the infrared signal $S_3$ into the free space to be received by the first optical system 530. An example of the first light source 520, an LED emitting infrared rays may be used. A person of ordinary The first optical system 530 inputs the infrared signal $S_3$ from the first light source 520, adjusts a divergence angle of the infrared signal $S_3$, and outputs the signal $S_4$. Also, the first optical system 530 can adjust an intensity distribution of the infrared signal $S_3$, and the infrared signal $S_4$ output from the first optical system 530 has an intensity with a Gaussian (bell) form which is intense (higher magnitude) at the center, and weak (lower magnitude) at both ends. It is preferable that the infrared signal $S_4$ has a divergence angle within a range of 0.1~30°.

The second light source 540 generates an unmodulated visible light signal $S_5$, and outputs the visible light signal $S_5$ to the free space. As the second light source 540, a continuous wave (CW) LD, or a CW LED can be used.

The second optical system 550 receives as an input the visible light signal $S_5$ output from the second light source 540, adjusts a divergence angle of the visible light signal $S_5$, and outputs the signal. Also, the second optical system 550 can adjust an intensity distribution of the visible light signal $S_5$, and a visible light signal $S_6$ output from the second optical system 550 may exhibit the bimodal form, which is weak at the center and intense at both ends. A divergence angle of the visible light signal $S_6$ is larger than the infrared signal $S_4$, and it is preferable that the visible light signal has the divergence angle within a range of 1~40°. Thus, the visible light divergence angle is greater than the infrared divergence angle, which can facilitate alignment and edge detection by the naked eye.

In other words the infrared signal $S_4$ is diverged in a divergence range of the visible light signal $S_6$, and thus, through the visible light signal $S_6$, the edge (communication coverage) of the infrared signal $S_4$ can be easily viewed with the naked eye at the receiving side of $S_6$. For this reason, the first and the second optical system 530 and 550 are closely set.

Still referring to FIG. 5, the third optical system 560 receives as an input an infrared signal $S_7$ received from the free space, condenses the infrared signal $S_7$, and outputs the signal. As a light receiving area of the optical detector 570 is much smaller than a divergence angle of the infrared signal $S_7$ sent to the third optical system 560, in order to improve receiving power of the optical detector 570, the third optical system 560 condenses the infrared signal $S_7$ to the light receiving area of the optical detector 570.

The optical detector 570 generates an electrical signal $S_9$ through photoelectric conversion of an infrared signal $S_8$ input from the third optical system 560, and outputs the electrical signal $S_9$ to the demodulation unit 580.

The demodulation unit 580 receives as an input the electrical signal $S_9$ from the optical detector 570 demodulates the electrical signal $S_9$, and outputs a data signal $S_{10}$. The data signal $S_{10}$ output from the demodulation unit 580 and is provided to another component (such as a controller) inside the portable wireless terminal. The demodulation unit 580 demodulates the electrical signal $S_9$ having power or a waveform suitable for the infrared communication, to the data signal $S_{10}$ having power or a waveform (such as a binary signal) suitable for data processing by the component. In other words, the demodulation unit 580 can eliminate a bias voltage applied to the electrical signal $S_9$.

Figure 6:
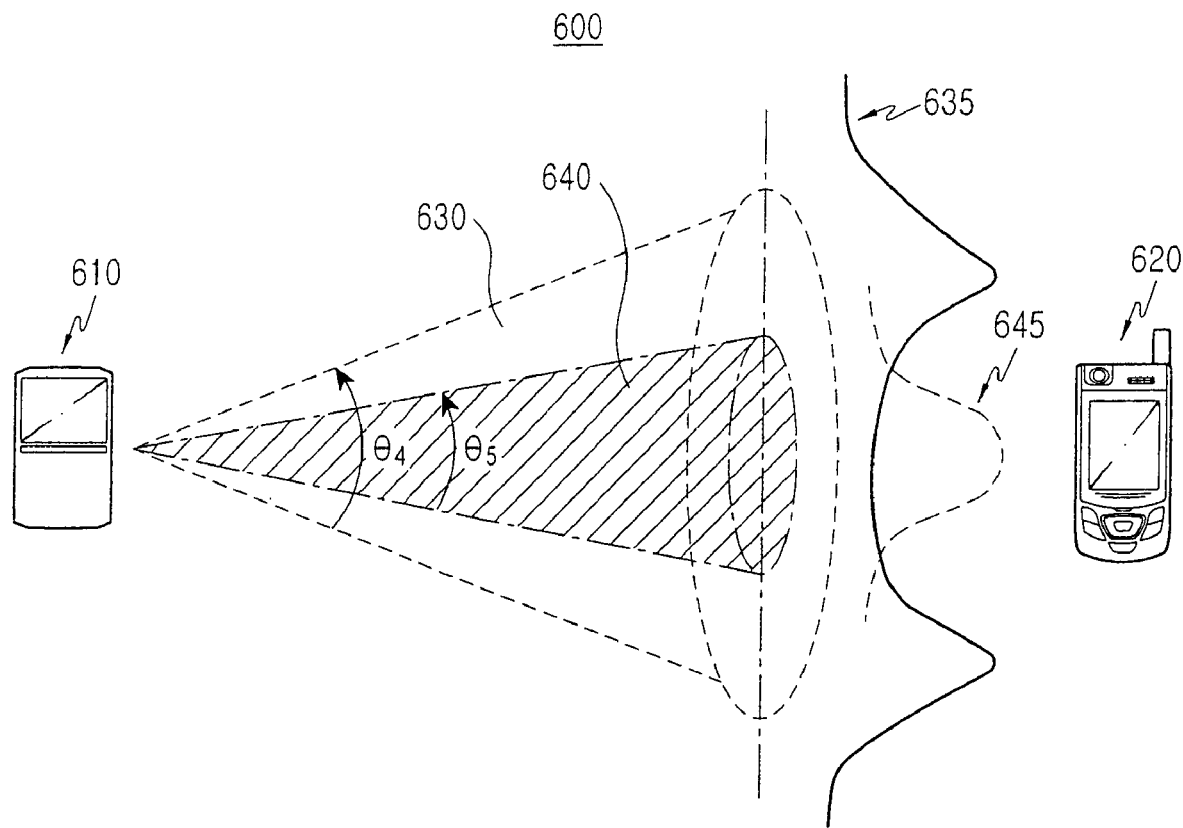
FIG. 6 illustrates a wireless communication system according to a third exemplary embodiment of the present invention.

FIG. 6 illustrates a wireless communication system according to a third exemplary embodiment of the present invention. The communication system 600 includes a first and second portable wireless terminals 610, 620, and each of the portable wireless terminals 610, 620 includes the wireless communication interface 500 shown in FIG. 5. Communication between the first and second portable wireless terminals 610, 620 is possible via a radio link, and an intensity distribution of an infrared signal received and transmitted between the first and second portable wireless terminals 610. 620 in this example shows the Gaussian form. Though the infrared signal cannot be viewed with the naked eye, it is possible to estimate the edge of the infrared signal through a visible light signal outputted from each of the portable wireless terminals 610, 620.

Still referring to FIG. 6, the first portable wireless terminal 610 transmits an infrared signal 640 having a divergence angle 05 within a range of 0.1~30° to the second portable wireless terminal 620. The intensity distribution 645 of the infrared signal 640 on a plane perpendicular to a traveling direction of the infrared signal 640 shows the Gaussian form which is more intense at the center, and more weak at both ends. Also, besides the infrared signal 640, the first portable wireless terminal 610 transmits a visible light signal 630 having a divergence angle 04 within a range of 1~40°. An intensity distribution 635 of the visible light signal 630 on a plane perpendicular to a traveling direction of the visible light signal 630 shows the bimodal form which is more weak at the center, and more intense at both ends.

The infrared signal 640 is positioned within a divergence range of the visible light signal 630, and thus, through the visible light signal 630, the edge of the infrared signal 640 can be viewed with the naked eye.

As described above, a wireless communication interface for a portable wireless terminal according to the present invention has one or more of following advantages.

First, a movement route of a visible light signal can be viewed with the naked eye, and thus it is easy to check communication security and secure a radio link.

Second, there is no need to enlarge a divergence angle of a visible light signal or an infrared signal in order to secure a radio link, and thus receiving power of a portable wireless terminal of a receiver is increased. Therefore, high-speed communication is possible.

Third, transmitting power of a portable wireless terminal of a transmitter can be reduced from that of known system, and thus a light source and an optical detector can be driven with low power.

Fourth, the present invention provides a wireless communication technology which can be used complementarily to an RF communication technology in trouble for an exhaustion of frequencies with an RF bandwidth, possibilities of cross talks between different wireless communication technologies, increasing requirements for communication security and advent of high-speed ubiquitous communication with a 4G wireless communication technology, etc.

Fifth, an infrared signal is used to communicate, and a visible light signal can be used to estimate communication coverage of the infrared signal, and thus the present invention can be compatible with a conventional infrared communication system with easier alignment than in a conventional infrared communication system.

While the invention has been shown and described with reference to certain exemplary embodiments thereof, it will be understood by those skilled in the art that various changes in form and details may be made therein without departing from the spirit and scope of the invention as defined by the appended claims. For example, the type of light source, the modulation, and the intensity distribution could be substituted with values other than described herein. The angle divergence angle range has also been provided for exemplary and best mode purposes, but these values may be different and still within the spirit of the invention and the scope of the appended claims.

What is claimed is:

1. A wireless communication interface for a portable wireless terminal, which wirelessly communicates with another device via a free space, the interface comprising:
   a first light source for generating a data-modulated infrared output signal;
   a first optical system for receiving as an input the infrared output signal from the first light source and outputting the infrared output signal to the free space;
   a second light source for generating a visible light output signal;
   a second optical system for receiving as an input the visible light output signal output from the second light source, for adjusting an intensity distribution of the input visible light, and for outputting the visible light output signal to the free space, with a second divergence angle determined based on the intensity distribution of the visible light output, wherein the second divergence angle is larger than a first divergence angle of the infrared output signal;
   an optical detector for receiving an infrared input signal from the free space, for generating an electrical input signal by photoelectrically converting the infrared input signal received from the free space, and outputting the electrical input signal; and
   a demodulation unit for demodulating the electrical input signal from the optical detector, and outputting a data signal,
   wherein the infrared output signal output from the first optical system exhibits a Gaussian intensity distribution which is more intense at the center, and more weak at both ends, and the visible light output signal from the first optical system exhibits a bimodal intensity distribution which is less intense at the center, and more intense at both ends of the distribution, and
   wherein a single intensity peak of the Gaussian intensity distribution is disposed between two intensity peaks of the bimodal intensity distribution.

2. The interface according to claim 1, wherein the infrared output signal is diverged within a divergence range of the visible light output signal.

3. The interface as claimed in claim 1, further comprising adjusting the first divergence angle of the infrared output signal.

4. The interface according to claim 1, further comprising a third optical system for receiving the infrared input signal from the free space, for condensing the infrared input signal, and for providing the infrared input signal to the optical detector.

5. The interface as claimed in claim 3, wherein the first divergence angle is within a range of about 0.1 to 30°.

6. The interface according to claim 3, wherein the second divergence angle is within a range of about 1 to 40°.

7. The interface according to claim 1, further comprising a modulator for modulating a data signal for input to the first light source.

8. A portable wireless terminal comprising
   an interface according to claim 1.

9. A system for wireless communication comprising:
   a first portable wireless terminal having an interface according to claim 1; and
   a second portable wireless terminal having an interface according to claim 1.

* * * * *